US010046673B1

(12) United States Patent
Mixon et al.

(10) Patent No.: US 10,046,673 B1
(45) Date of Patent: Aug. 14, 2018

(54) SEAT RAIL END STOP (71) Applicant: AISIN TECHNICAL CENTER OF AMERICA, INC., Northville, MI (US)

(72) Inventors: Michael Mixon, Brighton, MI (US); Satoshi Masuda, Novi, MI (US); Ryosuke Mizuno, Aichi (JP)

(73) Assignee: AISIN TECHNICAL CENTER OF AMERICA, INC, Northville, MI (US)

( * ) Notice: Subject to any disclaimer, the term of this patent is extended or adjusted under 35 U.S.C. 154(b) by 0 days.

(21) Appl. No.: 15/425,699

(22) Filed: Feb. 6, 2017

(51) Int. Cl.
*B60N 2/00* (2006.01)
*B60N 2/07* (2006.01)

(52) U.S. Cl.
CPC ......... *B60N 2/0727* (2013.01); *B60N 2/0722* (2013.01)

(58) Field of Classification Search
CPC .......... B60P 7/0815; B60P 7/0807; B60P 7/08
USPC ................... 248/419, 424, 429, 430
See application file for complete search history.

(56) References Cited

U.S. PATENT DOCUMENTS

| 6,098,946 | A  | * | 8/2000  | Sechet  | B60N 2/0705 248/424 |
| 7,566,086 | B2 | * | 7/2009  | Gray    | H04L 12/2856 296/65.03 |
| 7,780,138 | B1 | * | 8/2010  | Lee     | B60N 2/0705 248/429 |
| 9,586,500 | B2 | * | 3/2017  | Shimizu | B60N 2/067 |
| 2013/0302626 | A1 | * | 11/2013 | Teufel  | B60N 2/0727 428/429 |
| 2013/0341479 | A1 | * | 12/2013 | Yamada  | B60N 2/0722 248/430 |
| 2014/0027600 | A1 | * | 1/2014  | Kato    | B60N 2/43 248/429 |
| 2017/0166090 | A1 | * | 6/2017  | Elsarelli | B60N 2/067 |

OTHER PUBLICATIONS

Chinese Office Action dated Mar. 14, 2014 in Chinese Patent Application No. 201721191515.X, 2 pages.

* cited by examiner

*Primary Examiner* — Steven M Marsh
(74) *Attorney, Agent, or Firm* — Oblon, McClelland, Maier & Neustadt, L.L.P.

(57) ABSTRACT

A seat assembly including a seat rail having an opening at an end of the seat rail, a seat slider that slides relative to the seat rail along a length of the seat rail, and an end stop at the end of the seat rail that prevents the seat slider from sliding beyond the opening and that substantially covers a cross section of the opening.

8 Claims, 6 Drawing Sheets

SEAT RAIL END STOP

BACKGROUND

Field of the Disclosure

The present disclosure is directed toward a seat end stop system and method for using an end stop bracket assembly.

Description of the Related Art

Vehicle seating systems may be adjusted in a variety of ways, both mechanically and electrically, to arrange vehicle seats in any number of locations within a vehicle interior and in various positions to accommodate a wide variety of combinations of occupants and users.

Occupants would benefit from having systems that offer enhanced functionality by providing a greater variety positions that better meet user needs, compared with those systems and methods presently available. Further, occupants may also benefit from ease of use and lower maintenance requirements. Lastly, through design improvements and reduced complexity, manufacturers may also benefit from simplifying and reducing cost while simultaneously improving quality and lowering costs.

For these reasons it is important that improved methods and apparatus for controlling seating systems continue to be developed with the aim of reducing vehicle mass, complexity, and part count, as well as providing additional flexibility to occupants.

SUMMARY

The present disclosure is directed to a system for controlling a seating assembly, the system including a seat rail having an opening at a first and at a second end, a seat slider positioned within the seat rail and able to slide along a length of the seat rail, and an end stop bracket assembly, connected to the first end of the seat rail.

The end stop bracket assembly mechanically prevents the seat slider from sliding beyond a position near the opening of the first end of the seat rail, and the end stop bracket assembly at least substantially covers the cross section of the seat rail opening.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

Figure 1:
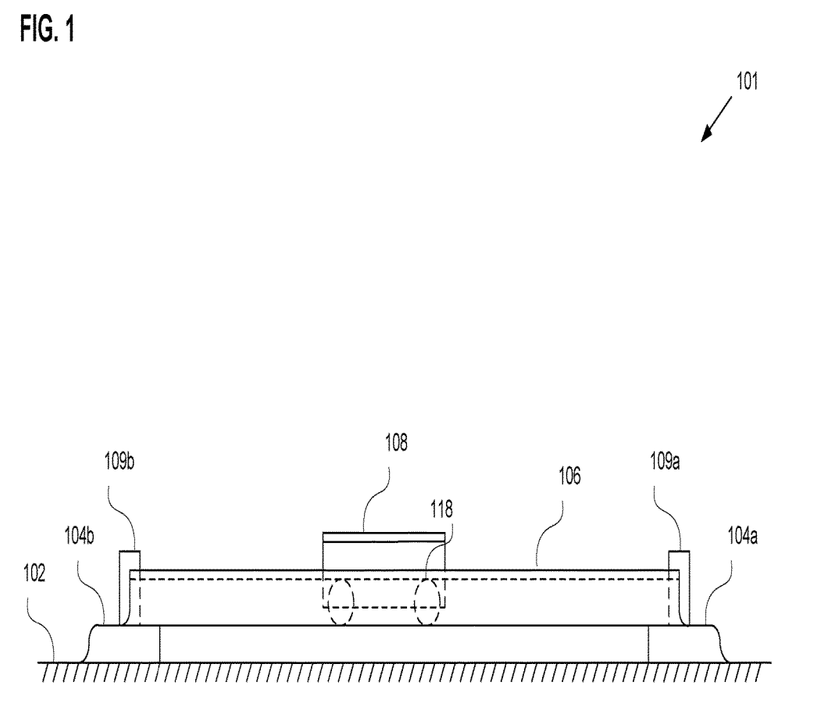
FIG. 1 is diagram representing a side view of a seat track assembly, according to one example.

FIG. 1 is diagram representing a side view of a seat track assembly 101, according to one example. The seat track assembly 101 comprises a seat rail 106 connected at a first end to a foot bracket 104a and at a second end to a foot bracket 104b. Each of the foot brackets 104a, 104b is connected to a vehicle interior surface 102. One or more seat sliders 108 may be positioned within the seat rail 106 to provide support for a vehicle seat or other adjustable platform to be adjusted relative to a vehicle interior (each seat or platform may have more than one seat slider 108 and/or seat rail 106), and may slide along a length of the seat rail 106. A number of seat slider rollers 118 may be connected to the seat slider 108 to allow the seat slider 108 to roll along a length of the seat rail 106 within the length of the seat rail 106. The seat rail 106 may also limit or prevent movement of the seat slider 108 in directions other than axially along the length of the seat rail 106, such as in a lateral or vertical direction. An end stop bracket assembly 109 may be connected at an end of the seat rail 106 to the seat rail 106, the foot bracket 104, and/or the vehicle interior surface 102. In one example, an end stop bracket assembly 109a is connected to the seat rail 106 at the first end of the seat rail 106, and an end stop bracket assembly 109b is connected to the seat rail 106 at the second end of the seat rail 106. The end stop bracket assemblies 109a, 109b restrict movement of the seat slider 108 to the length of the seat rail 106 located between the first end stop bracket assembly 109a and the second end stop bracket assembly 109b.

In another example, the seat track assembly 101 may have only one foot bracket 104, such as the foot bracket 104a, as the second end of the seat rail 106 may be connected directly to the vehicle interior surface 102. In another example, the seat track assembly 101 may not have any foot brackets 104a, 104b, such as in a case where both the first and the second end of the seat rail 106 are connected directly to the vehicle interior surface 102. In the two aforementioned examples, it may be that features of the foot bracket 104 may be built into the seat rail 106.

Further, the seat rail 106 may be connected to the vehicle interior surface 102 in a number of directions, for example, along a longitudinal axis of the vehicle to adjust a seating position in a fore/aft direction, or along a lateral axis of the vehicle to adjust a seating position in a side-to-side direction.

Figure 2:
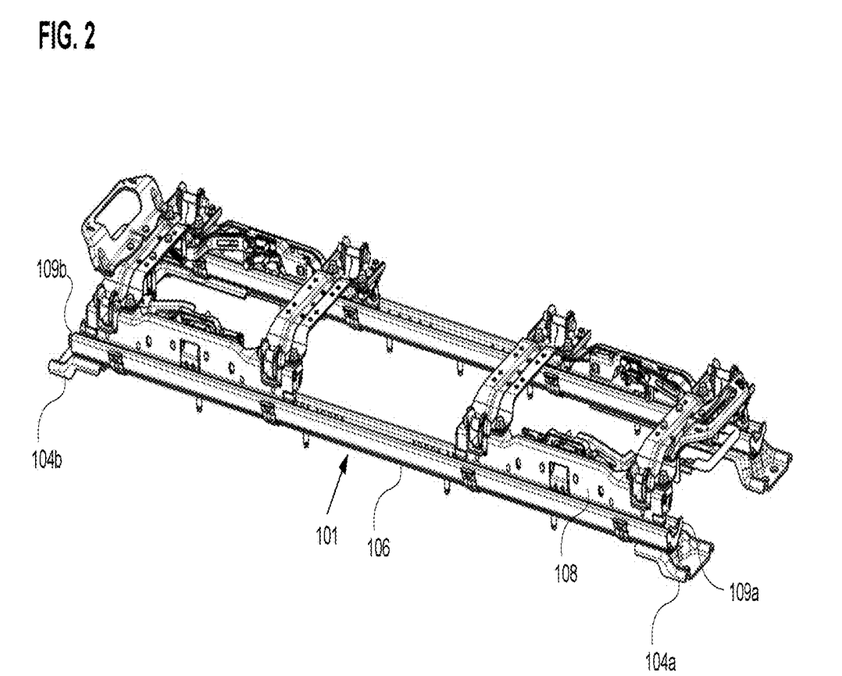
FIG. 2 is an isometric view of the seat track assembly connected to a seat mounting system, according to one example.

FIG. 2 is an isometric view of the seat track assembly 101 connected to a seat mounting system, according to one example. The seat track assembly 101 comprises the seat slider 108 slideably connected to the seat rail 106 such that the seat slider 108 may slide along the length of the seat rail 106. The seat rail 106 is supported at the first end by the foot bracket 104a and at the second end by the foot bracket 104b. The end stop bracket assembly 109a is shown rigidly connected near the first end of the seat rail 106 to limit movement of the seat slider 108, preventing the seat slider 108 from sliding past the first end of the seat rail 106 while the end stop bracket assembly 109b is rigidly connected near the second end of the seat rail 106 to limit movement of the seat slider 108, preventing the seat slider 108 from sliding past the second end of the seat rail 106.

Figure 3:
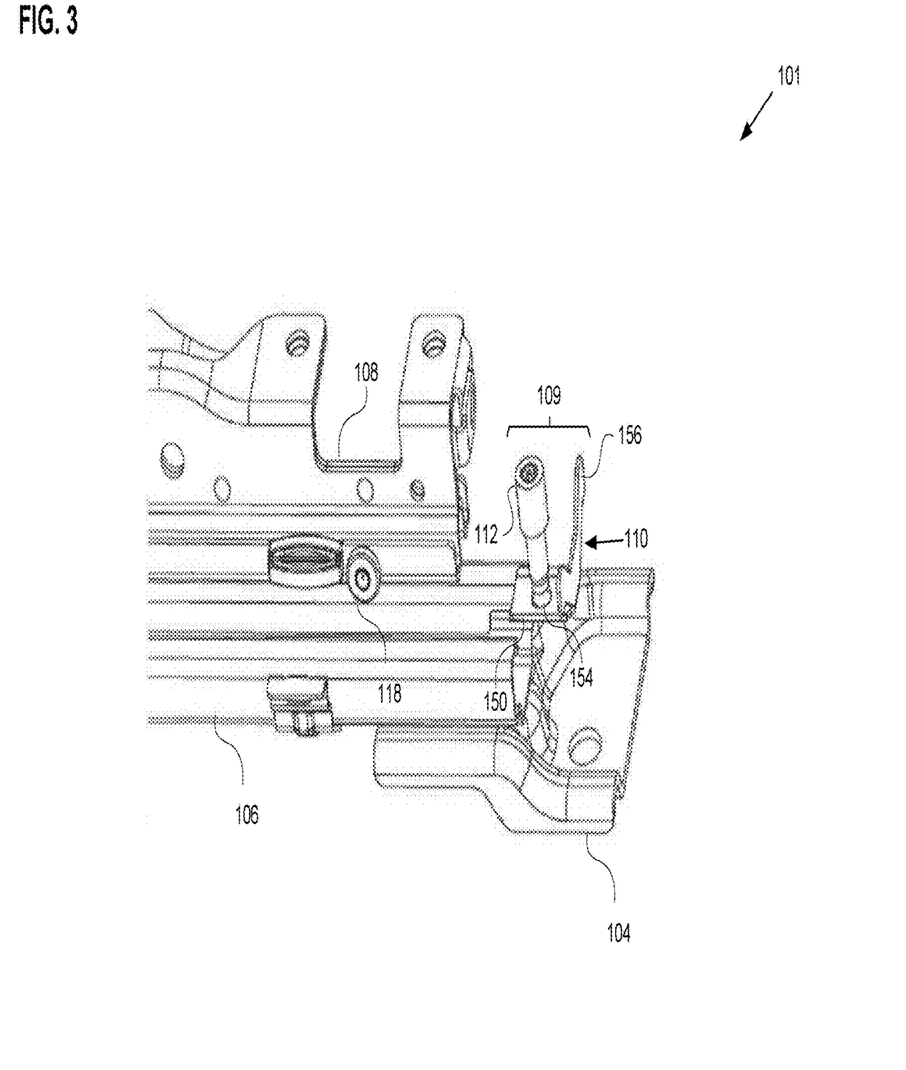
FIG. 3 is an assembly perspective view of an end of the seat track assembly, according to one example.

FIG. 3 is an assembly perspective view of an end of the seat track assembly 101, according to one example. The seat track assembly 101 comprises the seat rail 106 connected to the foot bracket 104, and the foot bracket 104 connects to the vehicle interior surface 102. The seat slider 108 slideably connects to the seat rail 106 through a number of seat slider rollers 118 that roll along a surface of the seat rail 106 to allow the seat slider 108 to move. The end stop bracket assembly 109 comprises an end stop bracket 110 and an end stop bolt 112. The end stop bracket 110 is formed symmetrically laterally and may be connected to the seat rail 106, the foot bracket 104, and/or the vehicle interior surface 102 by the end stop bolt 112. In this example, and illustrated in FIG. 5A, viewed from a side, the end stop bracket 110 may have an "L" shape having a substantially vertical surface 156 and a substantially horizontal surface 150, and be rigidly connected to at least one of the seat rail 106, the foot bracket 104, and the vehicle interior surface 102 by a fastener, for example, the end stop bolt 112 that prevents the seat slider 108 from sliding beyond a certain location along the length of the seat rail 106. The end stop bolt 112 prevents the seat slider 108 from moving beyond a certain length of the seat rail 106 since an end of the seat slider 108 will eventually make contact with the end stop bolt 112 as the seat slider 108 moves along the length of the seat rail 106. The end stop bolt 112 may be a bolt or fastener that protrudes approximately vertically from the horizontal surface 150 of the end stop bracket 110 when installed such that the end stop bolt 112 is able to prevent movement of the seat slider 108 in one direction along the length of the seat rail 106 by providing resistance mainly in shear. The end stop bolt 112 connects with the end stop bracket 110 through a mounting hole 154 located in the horizontal surface 150.

Further, the vertical portion 156 of the end stop bracket 110 may have a cross section that matches or substantially overlaps and covers a cross section of the end of the seat rail 106.

In one example, the cross section of the vertical portion 156 of the end stop bracket 110 approximately matches an interior cross section of the seat rail 106, allowing the vertical portion 156 to fit inside the seat rail 106 and block debris from entering the interior of the seat rail 106, as well as allowing placement of at least a portion of the end stop bracket assembly 109 within the seat rail 106.

In one example, the end stop bolt 112 connects the end stop bracket 110 to the seat rail 106.

In another example, the end stop bolt 112 connects the end stop bracket 110 to the seat rail 106 and the foot bracket 104.

In another example, the end stop bolt 112 connects the end stop bracket 110 to the seat rail 106 and the foot bracket 104, as well as the vehicle interior surface 102.

Figure 4:
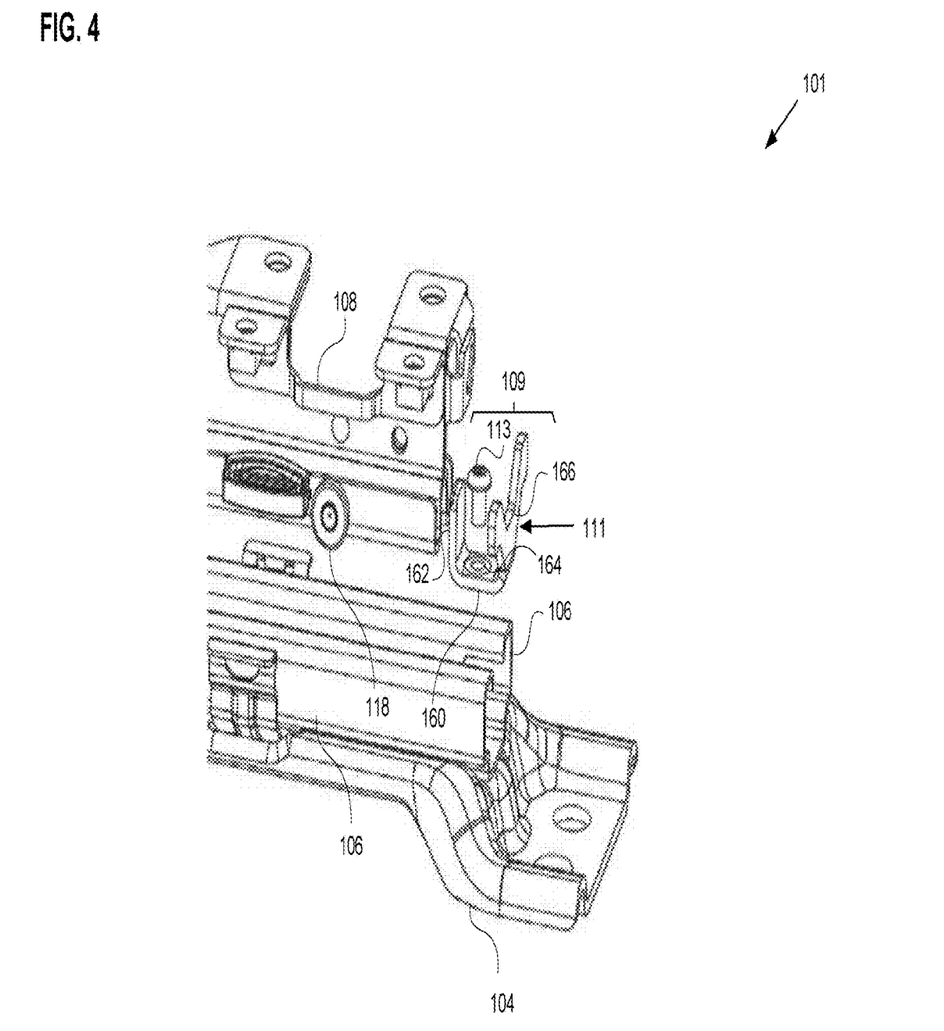
FIG. 4 is an assembly perspective view of an end of the seat track assembly, according to one example.

FIG. 4 is an assembly perspective view of an end of the seat track assembly 101, according to one example. The seat track assembly 101 may be identical to that illustrated by FIG. 3 with the exception that instead of the end stop bracket 110 and the end stop bolt 112, the end stop bracket assembly 109 comprises an end stop bracket 111 and an end stop bolt 113, the end stop bolt 113 securing the end stop bracket assembly 109 (through the mounting hole 164) to at least one of the seat rail 106, the foot bracket 104, and the vehicle interior surface 102. In this example, and illustrated in FIG. 5B, viewed from a side the end stop bracket 111 may have a "U" shape having a substantially horizontal surface 160, similar to the horizontal surface 150 of the end stop bracket 110 but with a first substantially vertical surface 166 and a second substantially vertical surface 162, the second vertical surface 162 facing the seat slider 108 such that the second surface 162 of the end stop bracket 111 obstructs movement of the seat slider 108 in one direction along the length of the seat rail 106, rather than the end stop bolt 112 of FIG. 3. The first vertical surface 166 of the end stop bracket 111 is similar to that of the substantially vertical surface 156 of the end stop bracket 110.

Further, the end stop bolt 113 that secures the end stop bracket 111 to at least one of the seat rail 106, the foot bracket 104, and the vehicle interior surface 102, may be different from the end stop bolt 112 since it does not need to protrude as the end stop bolt 112 does in FIG. 3 in order to stop movement of the seat slider 108.

In one example, the cross section of the vertical portion 166 of the end stop bracket 111 approximately matches an interior cross section of the seat rail 106, allowing the vertical portion 166 to fit inside the seat rail 106 and block debris from entering the interior of the seat rail 106, as well as allowing placement of at least a portion of the end stop bracket assembly 109 within the seat rail 106.

Further, the cross section of the second vertical portion 162 of the end stop bracket 111 may fit within a cross section of the seat rail 106 as well, providing the surface for the end stop bracket assembly 109 to come into contact with the seat slider 108.

Figure 5A:
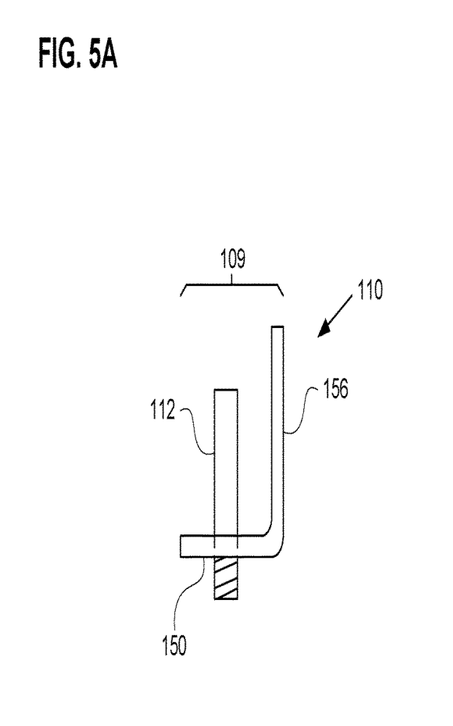
FIG. 5A is a side view of an end stop bracket, according to one example.

FIG. 5A is a side view of an end stop bracket assembly 109, according to one example. The end stop bracket assembly 109 may comprise an end stop bracket 110 and an end stop bolt 112, and the end stop bracket 110 may be positioned approximately at a first end of the seat rail 106 and may be connected to at least one of the vehicle interior surface 102, the foot bracket 104, and the seat rail 106 by the end stop bolt 112. The end stop bracket 110 comprises a substantially horizontal portion 150 with a mounting hole 154 (see FIG. 3) through which the end stop bolt 112 is connected. The end stop bracket 110 is positioned such that the seat slider 108 makes contact with the end stop bolt 112, limiting movement of the seat slider 108 at that end of the seat rail 106 to within the length of the seat rail 106.

A substantially vertical portion 156 of the end stop bracket 110 may have a cross section that matches or largely overlaps a cross section of an opening at the end of the seat rail 106 and positioned such that the end stop bracket 110 may substantially close off an opening at the end of the seat rail 106, shielding the opening from debris and other foreign matter from entering the opening.

In one example, illustrated by FIG. 3, an end stop bracket 110 is positioned at a first end of the seat rail 106. A seat slider 108 is positioned within the seat rail 106 and slides along a length of the seat rail 106. An end stop bolt 112 of the end stop bracket 110 limits movement of the seat slider 108 past the end stop bolt 112 of the end stop bracket 110.

Figure 5B:
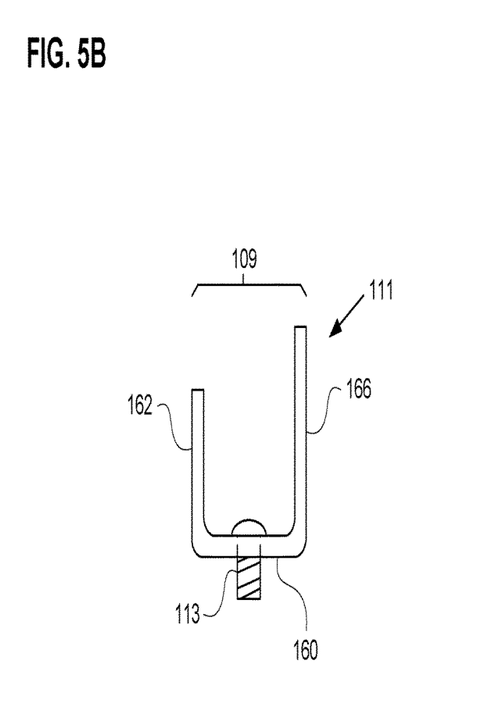
FIG. 5B is a side view of an end stop bracket, according to one example.

FIG. 5B is a side view of the end stop bracket assembly 109, according to one example. The end stop bracket assembly 109 may comprise an end stop bracket 111 and an end stop bolt 113, and the end stop bracket 111 may be positioned approximately at an end of the seat rail 106 and may be connected to at least one of the vehicle interior surface 102, the foot bracket 104, and the seat rail 106 by the end stop bolt 113. The end stop bracket 111 comprises a substantially horizontal portion 160 with a mounting hole 164 (see FIG. 4) through which the end stop bolt 113 is connected. The end stop bracket 111 is positioned such that the seat slider 108 makes contact with a second substantially vertical portion 162 of the end stop bracket 111, limiting movement of the seat slider 108 at that end of the seat rail 106 to within the length of the seat rail 106.

A first substantially vertical portion 166 of the end stop bracket 111 may have a cross section that matches or largely overlaps a cross section of the opening at the end of the seat rail 106 (like the substantially vertical portion 156 of the end stop bracket 110) and positioned such that the first vertical portion 166 of the end stop bracket 111 may substantially close off an opening at the end of the seat rail 106, shielding the opening from debris and other foreign matter from entering the opening.

Figure 6:
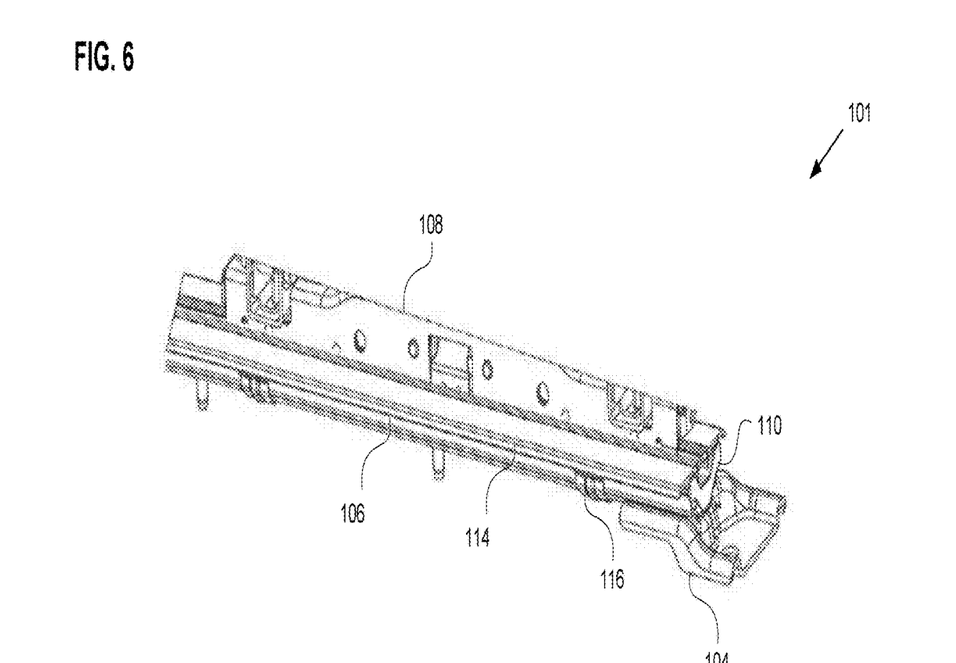
FIG. 6 is a perspective view of a portion of the seat track assembly, according to one example.

FIG. 6 is a perspective view of a portion of the seat track assembly 101, according to one example. The seat track assembly 101 further comprises a molding 114 connected to and positioned above the seat rail 106. The seat rail 106 may have a substantially open upward facing channel along its length to allow movement of the seat slider 108. The molding 114 may comprise a single piece and serve as a cover to shield the upward facing channel of the seat rail 106 from debris and other foreign matter while also allowing the seat slider 108 to move along the length of the seat rail 106. As such the molding 114 may have an open slot along most of its length to accommodate the seat slider 108. The molding 114 may be secured to the seat rail 106 by a number of molding brackets 116 positioned periodically along a length of the molding 114 where the molding 114 is in contact with the seat rail 106 to prevent movement of the molding 114, such as in a vertical or lateral direction. The molding 114 may be prevented from moving axially along the length of the seat rail 106 by the vertical portion 156 of the end stop bracket 110 (shown) or the second vertical portion 166 of the end stop bracket 111. The seat rail 106 may be connected at an end to the foot bracket 104.

In another example, the vertical portion 156 of the end stop bracket 110 or the second vertical portion 166 of the end stop bracket 111 may be formed to also secure the molding 114 to prevent movement of the molding 114 in at least one of a vertical and a lateral direction, and may not require any molding bracket 116.

In another example, the molding 114 may comprise two separate portions, a first portion 114a positioned on a first side of the seat rail 106 and a second portion 114b positioned on a second, opposite side of the seat rail 106 and with a gap between the first portion 114a and the second portion 114b along a length of the seat rail 106 to accommodate movement of the seat slider 108 along the length of the seat rail 106. As in the previous example, the first portion 114a and the second portion 114b may be secured to the seat rail 106 by a number of molding brackets 116 positioned periodically along a length of the first portion 114a and the second portion 114b where each is in contact with the seat rail 106. The molding 114 may be formed of a variety of materials such as rigid or malleable plastic, vinyl, and/or rubber compounds and in a variety of colors.

In another example, the seat rail 106 may have an end stop bracket assembly 109 or an end stop bolt 112 connected periodically in a middle portion of the seat rail 106 for restricting movement of the seat slider 108 to a length of the seat rail 106. This may be for accommodating more than one seat slider 108 to the seat rail 106 or to increase the number of mounts for seat rail 106 for added strength. The end stop bracket assembly 109 may comprise an end stop bracket 110 and an end stop bolt 112 or an end stop bracket 111 and an end stop bolt 113.

Figure 7:
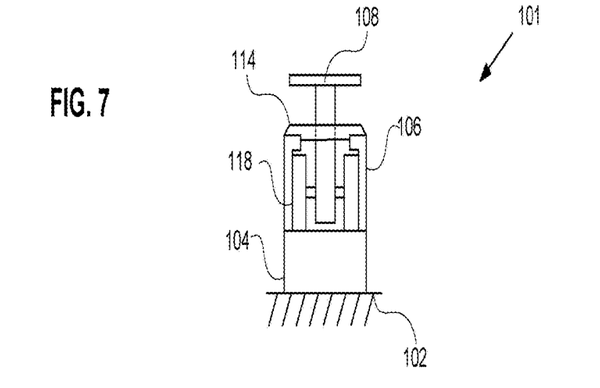
FIG. 7 is a front view of the seat track assembly, according to one example.

FIG. 7 is a front view of the seat track assembly 101, according to one example. The seat track assembly 101 comprises the foot bracket 104 that connects the seat rail 106 to the vehicle interior surface 102. The seat slider 108 may be positioned within the seat rail 106 and slideably connected by a number of seat slider rollers 118 connected to the seat slider 108. The seat rail 106 may have the molding 114 connected to help seal the open, upward facing channel that allows the seat slider 108 to move within the seat rail 106, the molding 114 covering the seat rail 106 to shield the upward facing opening from debris and other foreign matter, and the end stop bracket 110 or end stop bracket 111 limiting movement of the molding 114, along the length of the seat rail 106. FIG. 7 does not show an end stop bracket 110, end stop bolt 112, end stop bracket 111, or end stop bolt 113 to enhance visibility of other components in this view.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, define, in part, the scope of the foregoing claim terminology such that no inventive subject matter is dedicated to the public.

What is claimed is:

1. A seat assembly, comprising:
  a seat rail having an opening at an end of the seat rail;
  a seat slider that slides relative to the seat rail along a length of the seat rail;
  an end stop at the end of the seat rail that prevents the seat slider from sliding beyond the opening and that substantially covers a cross section of the opening;
  a foot bracket connected to a bottom surface of the seat rail, the foot bracket configured to be connected to a vehicle interior surface, wherein
  the end stop includes a bracket comprising a horizontal portion with a mounting hole, a vertical portion, and a bolt through the mounting hole,
  the bolt fastens the end stop and the seat rail to the foot bracket,
  the vertical portion covers the cross section of the opening, and
  an end of the bolt extends upward from the horizontal surface to prevent the seat slider from sliding beyond the opening.

2. The seat assembly according to claim 1, wherein the bolt protrudes above the horizontal portion and is configured to contact the seat slider to prevent further relative travel along the length of the seat rail.

3. The seat assembly according to claim 1, wherein the bolt fastens the end stop to a bottom inner surface of the seat rail.

4. A seat assembly, comprising:
  a seat rail having an opening at an end of the seat rail;
  a seat slider that slides relative to the seat rail along a length of the seat rail;
  an end stop at the end of the seat rail that prevents the seat slider from sliding beyond the opening and that substantially covers a cross section of the opening;

a foot bracket connected to a bottom surface of the seat real, the foot bracket configured to be connected to a vehicle interior surface, wherein the end stop includes a bracket comprising a horizontal portion with a mounting hole, a first vertical portion, a second vertical portion, and a bolt through the mounting hole, the bolt fastens the end stop and the seat rail to the foot bracket, the first vertical portion extends from a first end of the horizontal portion and covers the cross section of the opening, and the second vertical portion extends from a second end of the horizontal portion and prevents the seat slider from sliding beyond the opening.

5. The seat assembly according to claim 1, wherein the bracket has a U-shape.

6. The seat assembly according to claim 4, wherein the second vertical portion is configured to contact the seat slider to prevent further relative travel along the length of the seat rail.

7. The seat assembly according to claim 6, wherein the bolt fastens the end stop to a bottom inner surface of the seat rail.

8. The seat assembly according to claim 1, further comprising:

a molding connected to a top of the seat rail, the molding including a gap in which the seat slider may move along a length of the molding.

\* \* \* \* \*